United States Patent
Puetz et al.

(10) Patent No.: US 9,784,373 B2
(45) Date of Patent: Oct. 10, 2017

(54) SHUT-OFF DEVICE AND GATE VALVE WITH A SHUT-OFF DEVICE

(71) Applicant: Z & J Technologies GmbH, Dueren (DE)

(72) Inventors: Robert Puetz, Dueren (DE); Ingo Wirtz, Eschweiler (DE)

(73) Assignee: Z & J Technologies GmbH, Dueren (DE)

( * ) Notice: Subject to any disclaimer, the term of this patent is extended or adjusted under 35 U.S.C. 154(b) by 60 days.

(21) Appl. No.: 14/829,128

(22) Filed: Aug. 18, 2015

(65) Prior Publication Data

US 2016/0061335 A1 Mar. 3, 2016

(30) Foreign Application Priority Data

Aug. 26, 2014 (DE) .......................... 10 2014 112 220

(51) Int. Cl.
*F16K 3/02* (2006.01)
*F16K 3/20* (2006.01)
*F16K 31/122* (2006.01)

(52) U.S. Cl.
CPC .......... *F16K 3/0254* (2013.01); *F16K 3/0218* (2013.01); *F16K 3/0227* (2013.01);
(Continued)

(58) Field of Classification Search
CPC .... F16K 3/0254; F16K 3/0218; F16K 3/0227; F16K 3/207; F16K 3/205; F16K 31/1225; F16K 51/02; F16K 3/0245; F16K 3/02
(Continued)

(56) References Cited

U.S. PATENT DOCUMENTS 3,367,625 A    2/1968   Fortune
3,768,774 A *  10/1973  Baugh .................. F16K 27/044
                                                    251/175
(Continued)

FOREIGN PATENT DOCUMENTS

DE    1000200 B   1/1957
DE    1173749 B   7/1964
(Continued)

OTHER PUBLICATIONS

German Patent and Trade Mark Office, Office Action for Application No. 102014112220.8, dated Jul. 1, 2015, 6 pages, Germany.

*Primary Examiner* — Marina Tietjen
(74) *Attorney, Agent, or Firm* — Alston & Bird LLP

(57) ABSTRACT

The invention relates to a shut-off device for valve systems of industrial plants, in particular of chemical and petrochemical plants, with a disc (12) to shut off an opening for a fluid flow and with a seal seat (13*a*). The invention is characterised in that the disc (12) is arranged between the seal seat and a pressing means (26) to subject the disc (12) to a pressing force and can be pressed by the pressing means (26) against the seal seat (13*a*), wherein the pressing means (26) has in a housing (10) a plurality of pistons (48) and a transmission element for transmitting the pressing force to the disc (12), the transmission element being arranged between the pistons (48) and the disc (12) and extending along the disc circumference, and wherein the pistons (48) are fluidically connected by a feed line (49) for hydraulic fluid.

20 Claims, 9 Drawing Sheets

(52) U.S. Cl.
CPC .............. *F16K 3/205* (2013.01); *F16K 3/207* (2013.01); *F16K 31/1225* (2013.01)

(58) Field of Classification Search
USPC ........ 251/193–204, 300–303, 326–329, 159, 251/170, 172, 175, 190
See application file for complete search history.

(56) References Cited

U.S. PATENT DOCUMENTS

| | | | | |
|---|---|---|---|---|
| 4,412,671 | A | * | 11/1983 | Tiefenthaler ........ F16K 31/1225 251/167 |
| 5,101,853 | A | * | 4/1992 | Mailliet ................. B65G 53/46 137/242 |
| 5,176,189 | A | * | 1/1993 | Perchthaler .......... B65D 90/587 137/240 |
| 5,577,707 | A | * | 11/1996 | Brida ........................ F16K 3/20 251/159 |
| 5,927,684 | A | | 7/1999 | Marx |
| 7,278,444 | B2 | | 10/2007 | Lucas |
| 2007/0228314 | A1 | * | 10/2007 | Geiser ....................... F16K 3/10 251/158 |

FOREIGN PATENT DOCUMENTS

| | | |
|---|---|---|
| DE | 1902832 U | 10/1964 |
| DE | 29623103 U1 | 12/1997 |
| GB | 997506 A | 7/1965 |
| WO | WO 02/072729 A1 | 9/2002 |

\* cited by examiner

SHUT-OFF DEVICE AND GATE VALVE WITH A SHUT-OFF DEVICE

CROSS-REFERENCE TO RELATED APPLICATIONS

This application claims priority to and the benefit of German Application No. 10 2014 112 220.8, filed Aug. 26, 2014, the entire disclosure of which as is hereby incorporated by reference herein.

BACKGROUND

Related Field

Various embodiments of the invention relate to a shut-off device with the features of the preamble to claim 1 and to a gate valve with the features of the preamble to claim 10. Such a shut-off device and such a gate valve are known for example from WO 02/072729 A1.

Generic gate valves are used in the chemical and petrochemical industry, in particular in so-call coking plants. Residues from the oil refinery are processed in such plants. A preferred method for this is delayed coking, wherein the residues to be processed are converted in a coke drum to petroleum coke or pet coke, liquid and gaseous hydrocarbons. The processing in the coke drum is carried out under approx. 3 to 8 bar and at a temperature of approx. 500° C. The petroleum coke is hardened with water vapour and water and then cut out of the coke drum with a water jet.

The coke drum is closed during the reaction. It is opened to cut out, or excise, the petroleum coke. Opening the drum is dangerous because very hot and combustible gases can thereby escape. Opening of the coke drum, so-called "de-heading", thus takes place automatically. Valves are used for this purpose which are connected to a corresponding drum opening and close or release this drum opening. On account of the high process temperatures and pressures the valves must be correspondingly sealed. To ensure defect-free operation, the valves are additionally to be easy to activate.

A distinction is made between so-called double disc gate valves and single disc gate valves. Double disc gate valves have two discs spaced apart from each other which are spread apart by a wedge mechanism. In the closed position a high sealing force is thereby produces which facilitates the safe and reliable operation of the double disc gate valve. Single disc gate valves are constructed more simply and have a smaller construction height. They have pre-tensioned sealing systems which generate the necessary sealing force.

Such a single disc gate valve and, generally, such a shut-off device are known for example from the aforementioned document WO 02/072729 A1.

The known single disc gate valve/the shut-off device has a single-part disc, at the distal end of which a pipe bridge is formed, through which, in the open position of the valve, access to the coke drum is realised. For this, the valve housing has a guide pipe which is screwed to the coke drum during use. In the open position the pipe bridge aligns with the guide pipe. In the closed position the guide pipe is shut off by the closed part of the single-part disc.

Sealing in the closed position is achieved by a combination of a dynamic seal seat with a static seal seat. The dynamic seal seat is reached through a plurality of pistons distributed around the circumference of the guide pipe which press with a wedge against a corresponding wedge surface of a sealing ring. Through an axial movement of the piston the sealing ring is moved downwards and presses against the valve disc. The piston is resiliently pre-tensioned so that it can compensate for thermal expansions. Through the dynamic sealing system the sealing force is introduced via the sealing ring into the valve disc.

The known system requires relatively high resources and can only produce limited sealing forces. The production and maintenance costs of the known single disc gate valves are thus comparatively high. In addition the safety of the known single disc gate valve is not sufficiently high.

BRIEF SUMMARY

It is the object of the invention to improve the operating safety of a gate valve and a shut-off device of the above-mentioned type.

This object is achieved according to the invention with respect to the shut-off device by and the gate valve by the subject matter of the claims provided herein Within the scope of the invention a shut-off device is indicated for valve systems of industrial plants, in particular chemical and petrochemical plants, with a disc to shut off an opening for a fluid flow and a seal seat. The disc is arranged between the seal seat and a pressing means to subject the disc to a pressing force or contact force. The disc can be pressed by the pressing means against the seal seat. The pressing means has a housing with a plurality of pistons and a transmission element to transmit the pressing force onto the disc, the transmission element being arranged between the pistons and the disc and extending around the circumference of the disc. The pistons are fluidically connected through a feed line for hydraulic fluid, in particular a shared feed line for hydraulic fluid.

A fundamental difference from the known shut-off device is that according to the invention the disc is pressed against the seal seat. In the prior art the seal seat is, vice versa, pressed against the valve disc. Through the invention the sealing or tightness and hence the operational safety of the system are improved, as it is possible to work with high pressing forces. The structure and control are significantly simplified, because the pistons are fluidically connected by the feed line so that all pistons can be centrally activated with the same pressure. In other words, the pistons are arranged in series. The individual activation and hence the coordination of the individual piston forces, as carried out in the prior art to implement the dynamic seal seats, are not required. This has the advantage that the operation is simplified. To open the shut-off device the pistons are connected in a pressure-free manner. This is realised centrally because the pistons are fluidically connected. In the closed position of the disc the pistons are subjected to pressure so that the required pressing force is produced which presses the disc against the seal seat. An adaptation of the pressing force is even possible during operation, if required, through the control of the hydraulic pressure.

The invention can be applied to a single disc gate valve and other shut-off elements for industrial plants which interrupt a fluid flow with a disc and have a seal seat.

Preferred embodiments of the invention are indicated in the sub-claims.

The transmission element can comprise a ring, of which the first end face lies against the disc and of which the second end face is connected to the pistons. The ring brings about a distribution of the forces introduced by the pistons over the circumference of the disc so that an even pressing force is achieved.

The lifting direction of the pistons is preferably perpendicular to the disc. A deflection of the force direction is not therefore necessary, whereby a simple and compact structure is facilitated.

A tappet can respectively be arranged between the pistons and the transmission element, in particular the ring, the tappet connecting the respective piston to the transmission element. This has the advantage that on the one hand the piston is spaced apart from the transmission element and on the other hand the introduction of force into the transmission element can be optimised by the tappet.

The transmission element, in particular the ring, can be subjected to a spring force which acts perpendicularly to the disc. The spring force preferably acts in the direction of the disc. The disc is thereby pre-tensioned against the seal seat, so that upon displacement of the disc, if the pressing force through the pistons is absent, a sufficient sealing effect is maintained.

The tappet is usefully connected to a spring, wherein the spring is supported against a tappet guide ring which is connected to the housing.

According to a preferred embodiment the pistons are arranged in a piston guide ring, in which the feed line for the hydraulic fluid is formed. The piston guide ring facilitates a compact arrangement and robust mounting of the pistons and is easy to assemble.

The piston guide ring can have pressure chambers which are arranged below the piston heads and are fluidically connected by the feed line. During operation the pressure chambers are filled with hydraulic fluid so that rapid activation of the pistons is facilitated upon activation.

The piston guide ring preferably has an annular cover which closes the lower side of the piston guide ring. The maintenance of the pistons and the feed line is thus facilitated.

Within the scope of the invention a gate valve is further indicated, in particular a single disc gate valve, for chemical and petrochemical plants, with a housing, in particular a valve housing. The housing has a guide pipe that can be shut off and a disc, in particular a valve disc, which can be displaced into an open position and a closed position and vice versa, wherein a seal seat is assigned to the guide pipe, the seal seat extending around the circumference of the guide pipe and sealing in operation, at least in the closed position, from above against the disc. The disc is arranged in a displaceable carrier plate and can be moved relative to the carrier plate in the direction of the longitudinal axis of the guide pipe. A pressing means is arranged in the housing below the disc in order to press the disc in the closed position against the seal seat. The pressing means has a plurality of pistons and a transmission element, in particular a ring, to transmit the pressing force onto the disc. The pistons are fluidically connected by a feed line for hydraulic fluid. The transmission element is arranged between the piston and the disc and extends around the disc circumference.

The gate valve according to the invention has various advantages:

Greater sealing forces can be produced with the invention. For this the pressing means is arranged below the valve disc, where more construction space is available, so that the individual components of the pressing means can be designed to be correspondingly larger. A fundamental difference from the known single disc gate valves is therefore that according to the invention the whole valve disc is pressed against the seal seat. According to the prior art, vice versa, the seal seat is pressed against the valve disc. It is provided according to the invention that the valve disc is arranged in the carrier plate and can be moved relative thereto in the direction of the longitudinal axis of the guide pipe. The carrier plate and the valve disc thus form two independent components which can be moved relative to each other. In contrast, according to the prior art the valve disc is formed in one part, meaning that it cannot be pressed as a whole against the seal seat, as the one-part valve disc is guided as a whole with longitudinal mobility in the valve housing.

The contact or pressing function of the single disc gate valve according to the invention can additionally be used to lock the valve disc in the closed position so that undesired displacement of the valve disc is securely prevented. This is not possible with a conventional dynamic seal seat.

The valve disc that is movable relative to the carrier plate has the further advantage that it can be removed from the carrier plate and easily exchanged for maintenance. The carrier plate remains in the housing.

The functional separation of the valve disc and carrier plate has the further advantage that the valve disc and the carrier plate are decoupled, meaning that the thermal distortion of the valve disc does not influence, or only influences to a small extent, the carrier plate and thus the guiding in the valve housing.

The separate valve disc has the further advantage that different materials can be used for the valve disc and the carrier plate. The material quality of the valve disc can thus be adapted to the particular requirements placed upon the valve disc as a shut-off element for the coke drum. The same applies to the surface refinement which can be limited to the valve disc. The production costs are thereby reduced.

With regard to the advantages according to the invention of the pistons fluidically connected by the feed line, in particular the shared feed line, reference is also made to the embodiments of the shut-off device according to the invention which also apply in association with the gate valve.

Preferred embodiments of the invention are indicated in the sub-claims. The valve disc can be arranged with radial play in the carrier plate. It is thereby possible to effectively avoid thermal expansions of the valve disc being transferred to the carrier plate. In addition the insertion of the valve disc into the carrier plate during assembly or during maintenance works is facilitated by the radial play.

The shape of the valve disc is preferably adapted to the cross-section of the guide pipe. The guide pipe usually forms a circular cross-section. In this case the valve disc is formed as a round disc. The round disc has the advantage that the thermal distortion takes place radially. In non-round valve discs, as in the prior art, thermal distortion generally takes place in an uncontrolled manner, which can lead to problems with the sealing or tightness and the guiding of the valve disc.

According to a preferred embodiment the carrier plate has a passage opening and a receiving opening, wherein the valve disc is arranged in the receiving opening. In the open position the passage opening aligns with the guide pipe. The passage opening can also be described as a pipe bridge. In the closed position the valve disc arranged in the receiving opening shuts off the guide pipe.

The receiving opening can have a conically downwardly enlarging edge. It is thereby ensured that any impurities getting between the edge of the valve disc and the edge of the receiving opening can be discharged downwards.

The direction indications "upwards" and "downwards" relate to the installation position of the valve. In the installation position of the valve the longitudinal axis of the guide pipe is vertically orientated. The carrier plate with the valve disc is displaced in the horizontal direction, i.e. perpendicular to the longitudinal axis of the guide pipe. The shut-off means is located, in the installation position, below the valve disc. The valve disc is thus arranged between the shut-off device and the coke drum in the closed position.

According to a further preferred embodiment the carrier plate is arranged between an upper and a lower guide plate which each have a passage opening in the region of the guide pipe, wherein the carrier plate is encapsulated between the guide plates. Linear guiding of the carrier plate is achieved with the two guide plates. In addition the guide plates seal the carrier plate and thus the valve disc so that gases or liquids cannot penetrate into the valve housing either in the open position or in the closed position. The sealing of the valve housing can be further improved by subjecting the valve housing to an overpressure.

The guide pipe can form an upper and a lower pipe nozzle, wherein the upper pipe nozzle together with the upper seal seat can be removed from the valve housing to form a maintenance opening, through which the valve disc can be removed from the valve housing. Along with the maintenance opening, the opening in the valve housing provided anyway in the region of the guide pipe is enlarged and indeed such that the valve disc can be removed through the maintenance opening. It is thus no longer necessary to remove the valve disc in the longitudinal direction out of the housing, which is associated with very high resources. To exchange the valve disc, it is merely necessary to remove the guide pipe together with the upper seal seat, so that the valve disc can then be removed from the housing.

The upper seal seat has at least one single acting, static sealing system which interacts with an upper side of the valve disc. In contrast with the prior art, it is not therefore necessary to provide a dynamically acting sealing system which applies the necessary sealing force. Instead a comparatively simply extended sealing system can be used, against which the valve disc as a whole is pressed. It is also possible, to improve the sealing function, to use a dual acting, a triple acting or a quadruple acting static sealing system. In the case of a dual acting sealing system, two separate sealing means are combined with each other. In a triple acting sealing system, three separate sealing means are combined with each other, and so on.

According to a particularly preferred embodiment a seal seat with a triple acting sealing system can have at least one radially inwardly arranged sealing and scraping edge, at least one radially outwardly arranged metal seal, and a gas barrier, in particular a vapour barrier, between them. The radially inwardly arranged sealing and scraping edge, which is also described as a scraper, forms a metal seal which seals against the surface of the valve disc. In addition, impurities that have become stuck to the surface of the valve disc are scratched off with the edge. The radially outwardly arranged seal is also a metal seal which seals against the surface of the valve disc. With the gas barrier arranged there-between, the penetration of gases and liquids into the inside of the valve housing is effectively prevented.

The pressing means is preferably arranged around the outer circumference of the valve disc. It is thus ensured that the passage opening formed by the guide pipe is structure-free so that the petroleum coke or other residues can be discharged from the coke drum outwardly through the guide pipe without hindrance. The arrangement of the pressing means around the outer circumference of the valve disc thus means that the pressing means do not project over the inner diameter of the guide pipe.

The pressing device preferably has a ring which, in the closed position, lies against the lower side of the valve disc and can be subjected to a pressing force which acts in the direction of the longitudinal axis of the guide pipe. It is thus ensured than an even pressing force is transmitted by the pressing means to the valve disc so that a correspondingly even sealing effect is achieved on the whole circumference of the valve disc. The pressing force acting in the direction of the longitudinal axis of the guide pipe thus acts in the installation position in the vertical direction or perpendicular to the valve disc.

The ring preferably forms a lower seal seat in particular in the form of a further metal seal which seals against the lower side of the valve disc. The ring thus has a dual function: on the one hand to transmit the sealing force from the pressing means to the valve disc, and at the same time the ring forms a seal which prevents impurities from getting into the valve housing.

According to the invention the pressing means has a plurality of force means distributed around the circumference of the valve disc in the form of pistons which, for subjecting the valve disc to a pressing force, preferably each generate a force acting in the direction of the longitudinal axis of the guide pipe. It is thus ensured that the pressing force is introduced into the valve disc at a plurality of points on the circumference of the valve disc so that the valve disc is evenly pressed against the upper seal seat.

The pressing means, in particular the ring, can be pretensioned against the valve disc. It is thereby ensured that the ring presses with a continuous force against the valve disc so that the sealing function in particular of the ring is maintained, even if the pressing means is not actively working.

A plurality of sets of springs, in particular sets of plate springs, are preferably distributed around the circumference of the ring which each subject the ring to a spring force acting in the direction of the longitudinal axis of the guide pipe. The sealing force of the lower seal seat is thus produced even if the pressing means is in a state of rest.

BRIEF DESCRIPTION OF THE DRAWINGS

The invention will be described below by reference to the attached schematic drawings in further detail with the aid of the example embodiments. These drawings show.

DETAILED DESCRIPTION OF VARIOUS EMBODIMENTS

Figure 1:
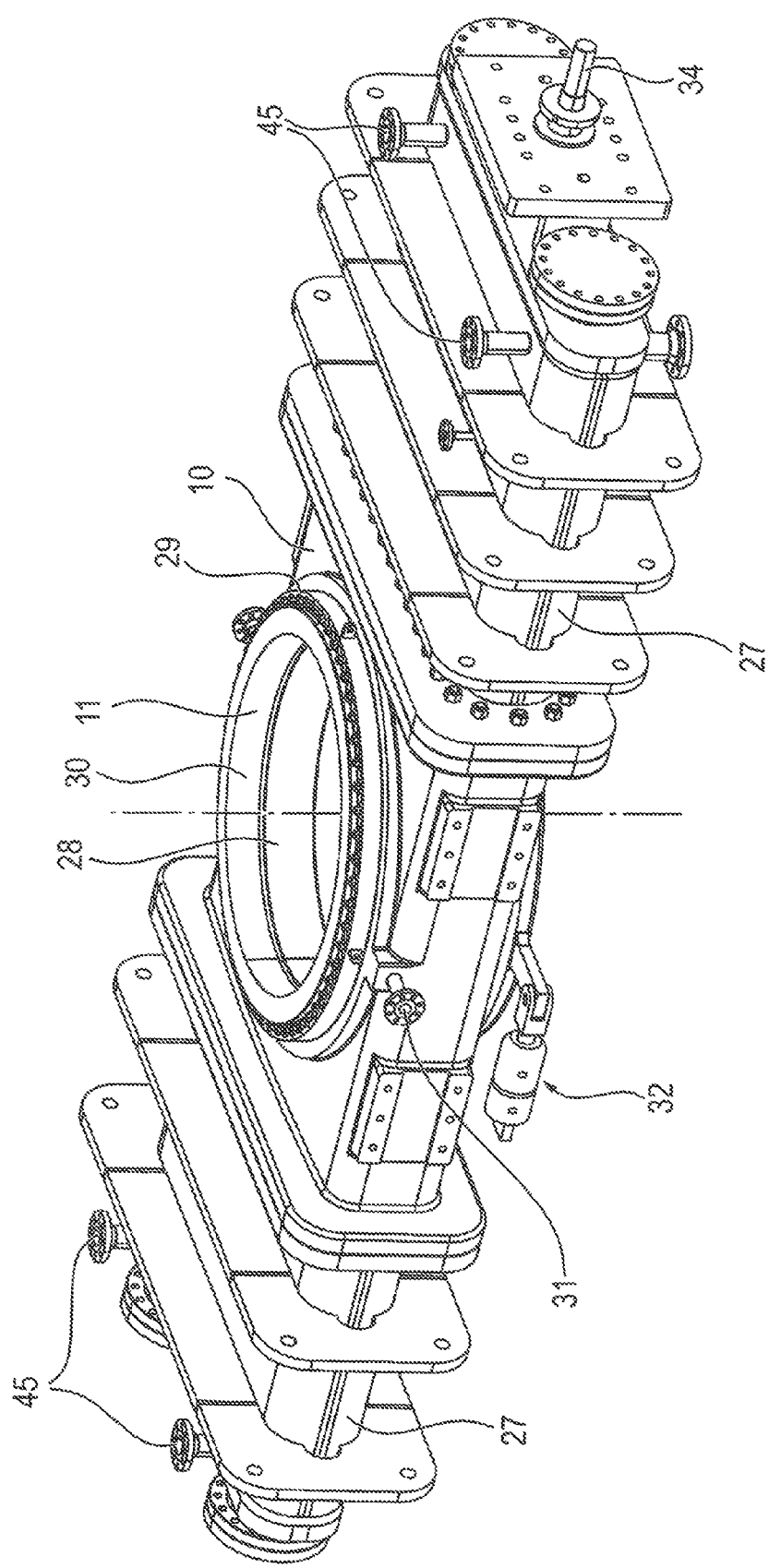
FIG. 1 a perspective view of a single disc gate valve.

The single disc gate valve according to FIG. 1 is used in coking plants, in particular in delayed coking plants, in which coke drums are provided with shut-off elements.

Specifically, the single disc gate valve shown in FIG. 1 is used to close the lower outlet opening of a coke drum (bottom de-heading). It is also possible to use the concept according to the invention in a shut-off element which is used to open and close the upper outlet opening of the coke drum (top de-heading). In addition the concept according to the invention or generally the invention can be used in association with shut-off elements used in other industrial fields such as ethylene, FCCU, phosgene, etc. In general a shut-off device according to the invention can be used as a shut-off element in chemical and petrochemical and other industrial plants, in which hot and/or reactive fluid flows are handled.

Within the scope of the invention on the one hand the gate valve is disclosed and claimed as a super-ordinate unit and on the other hand the shut-off device with disc, seal seat and pressing means are disclosed and claimed separately as part of the gate valve. The shut-off device is not limited to use in a gate valve, in particular a single disc gate valve, but instead can also be used in other valve systems in industrial plants, in which fluid flows are controlled.

The generally used construction features will be explained by reference to the single disc gate valve shown in FIGS. 1 to 3. Instead of the mechanically activated pressing means of the single disc gate valve shown in FIGS. 1 to 4, however, within the scope of the invention a hydraulic pressing means is used which is explained for example by reference to FIGS. 5 to 8. The general construction features described below are retained in the example embodiment according to the invention.

The single disc gate valve shown in FIG. 1 has a valve housing 10. The valve housing 10 is arranged between two bonnets 27 which extend in the longitudinal direction of the valve housing 10. The two bonnets 27 and the valve housing 10 are screwed together. The two bonnets 27 surround the displacement stretches of the structures incorporated in the valve housing that are necessary to activate the single disc gate valve. The valve housing 10 has a guide pipe 11 which forms a fluid passage 28. The fluid passage 28 aligns, in the assembled state, with the outlet opening of the coke drum (not shown). The petroleum coke portions located in the coke drum are removed through the fluid passage 28, for example through water jet cutting. The guide pipe 11 has an upper pipe nozzle 18 (shown in FIG. 1) which is screwed to the valve housing 10. An upper seal seat 13a (which can be seen in FIG. 2) is assigned to the guide pipe 11, specifically to the upper pipe nozzle 18. The upper pipe nozzle 18 has an annular flange 29 which is screwed to the valve housing 10.

It can further be seen in FIG. 1 that the inner diameter of the guide pipe 11 has a hard plating 30 which protects the guide pipe 11 from abrasive wear.

The guide pipe 11 extends along a longitudinal axis shown in FIG. 1. In the installation state, the longitudinal axis extends in the vertical direction. The longitudinal axis of the guide pipe aligns with the longitudinal axis of the coke drum (not shown).

It can further be seen in FIG. 1 that the valve housing has a purge or barrier gas connection 31 which is arranged at the upper edge of the valve housing. The purge and barrier gas connection supplies the seal seat 13a with purge or barrier gas. Specifically, vapour is used as barrier gas in the single disc gate valve according to FIG. 1

A pressing means 26 is provided on the lower longitudinal edge of the valve housing 10. The mechanical actuating cylinder 32 shown is replaced by the hydraulic pressing means according to FIGS. 6 to 9. In other respects, the previously described construction features are assumed.

Further gas connections 45 are provided at the two bonnets 27 which are used to subject the two bonnets and the valve housing to a sealing pressure.

An actuating rod extends out of the right bonnet 27 shown in FIG. 1 in the longitudinal direction, with which the single disc gate valve is brought into the open or closed position. The actuating rod is connected to a suitable drive during use.

Figure 2:
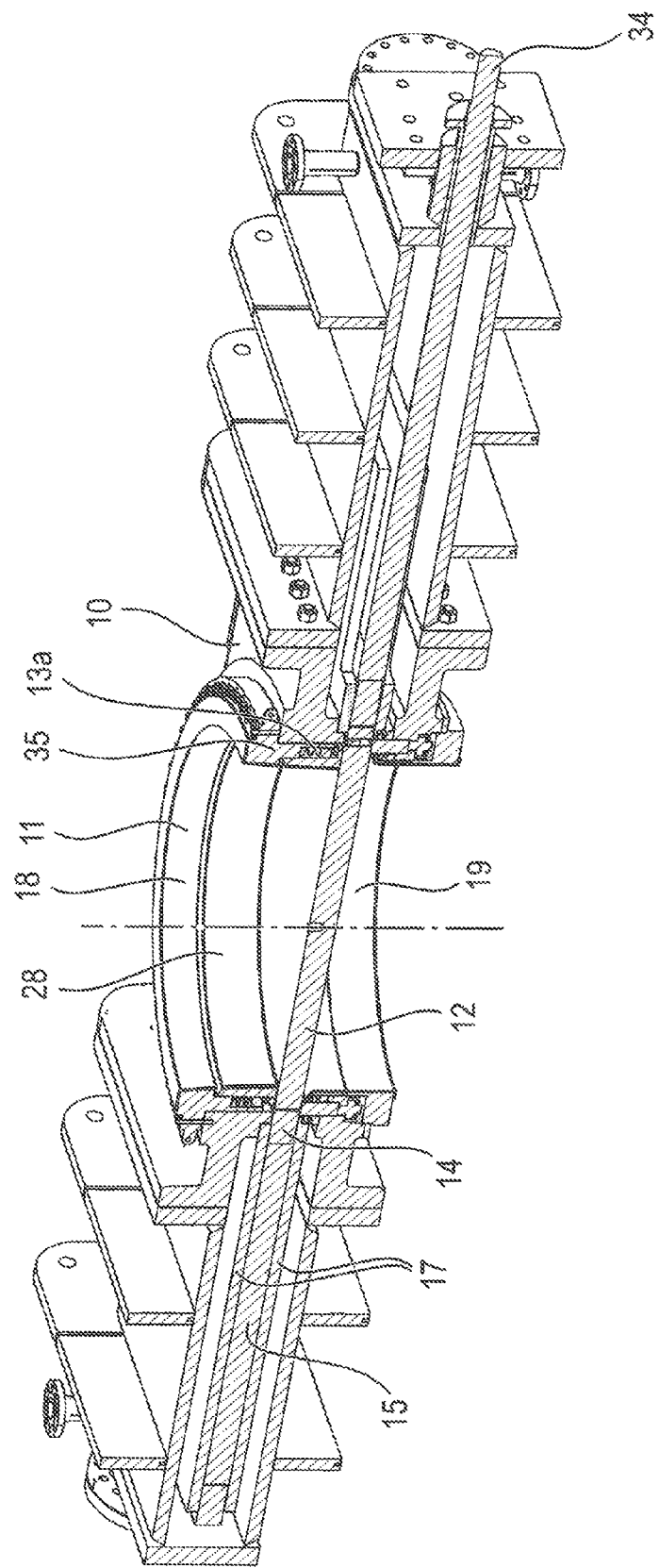
FIG. 2 a longitudinal section of the single disc gate valve according to FIG. 1.
Figure 3:
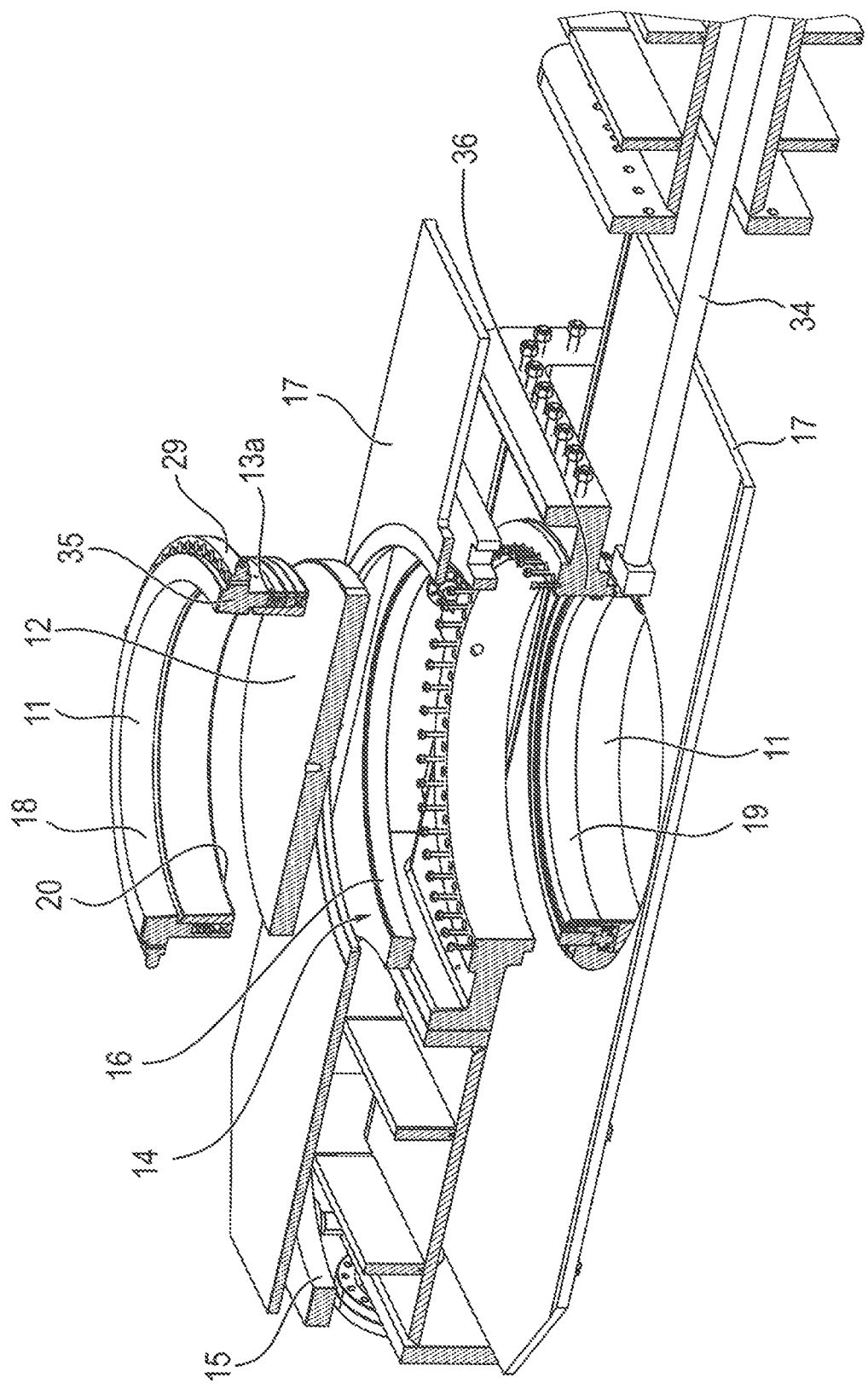
FIG. 3 an exploded view of the single disc gate valve according to FIG. 1.

FIGS. 2 and 3 show the structure of the single disc gate valve according to FIG. 1. In the valve housing 10 a valve disc 12 is arranged which can be displaced into an open position and into a closed position and vice versa. In the open position the valve disc 12 releases the guide pipe 11 so that the coke drum flanged to the guide pipe becomes accessible. In the closed position the valve disc 12 shuts off the guide pipe and prevents gases, liquids and solids located in the coke drum from being retained. The sealing of the valve disc 12 is realised by an upper seal seat 13a.

The position descriptions "upper" and "lower" refer to the operating state of the single disc gate valve which is horizontally arranged. As can be seen in FIGS. 2, 3 in association with FIG. 1, the seal seat 13a extends around the circumference of the guide pipe 11, specifically around the circumference of the upper pipe nozzle.

A peculiarity of the single disc gate valve according to FIGS. 1-3 is that the valve disc 12 is arranged in a displaceable carrier plate 14. The valve disc 12 and the carrier plate 14 are two separate components which have different functions. The valve disc 12 is only used to close the guide pipe 11. The carrier plate 14 holds the valve disc 12 and displaces it into the open position or into the closed position and vice versa. For this, the carrier plate 14 has a receiving opening 16, in which the valve disc 12 is arranged (see FIGS. 2, 3). The receiving opening 16 has such dimensions that the valve disc 12 can be moved relative to the carrier plate 14 in the direction of the longitudinal axis of the guide pipe 11. In other words, the valve disc 12 can be moved perpendicularly to its radial expansion. For this, a corresponding play is provided between the valve disc 12 and the receiving opening 16 which has dimensions such that misalignment of the two components due to thermal expansions of the valve disc 12 and the carrier plate 14 is prevented. The purpose of the axial mobility of the valve disc 12 is to facilitate the pressing of the valve disc 12 against the upper static seal seat 13a. The pressing force is reached by the previously mentioned pressing means 26 which is arranged in the installed position below the valve disc 12.

With the axially movable valve disc 12 and the pressing means 26 it is ensured that in the closed position of the valve disc 12 the latter can be pressed against the upper seal seat 13a so that the sealing force between the upper seal seat 13a and the valve disc 12 is increased.

The carrier plate 14 has, in addition to the receiving opening 16, a passage opening 15 which can also be described as a pipe bridge. In the open position the passage opening 15 aligns with the fluid passage 28 of the guide pipe 11 and releases the coke drum. The diameter of the passage opening 15 or the pipe bridge has such dimensions that the upper seal seat 13a and also the lower seal seat 13b, described in more detail at another point, seal the passage opening 15 so that gas and liquids are prevented from penetrating into the inside of the valve housing 10. The receiving opening 16 and the passage opening 15 are arranged one beside the other so that they are each moved through a translational movement of the carrier plate 14 into the guide pipe 11 in order to realise the open position and the closed position of the single disc gate valve.

The carrier plate 14 is arranged between two guide plates 17 which encapsulate the carrier plate 14. The two guide plates 17 and the carrier plate 14 are arranged plane parallel. For actuation of the carrier plate 14 and thus of the valve disc 12 arranged in the carrier plate 14, an actuating rod 34 is provided which is connected with positive locking to an end of the carrier plate 14, so that pushing and pulling forces can be transmitted to the carrier plate 14. The actuating rod 34 projects out of one of the two bonnets 27 and can be connected to a drive (not shown). The actuating rod 34 is arranged between the two guide plates 17 which are spaced apart from each other in parallel.

It can further be seen in FIG. 3 that the upper pipe nozzle 18 can be completely removed from the valve housing 10. The means that the upper part of the guide pipe 11 including the upper seal seat 13a can be removed, whereby a maintenance opening is formed in the valve housing 10 that is large enough to facilitate removal of the valve disc 12. For this, the upper pipe nozzle 18 is formed as a singly manageable unit. The upper pipe nozzle 18 has a support ring 35, on which the annular flange 29 is attached. The support ring 35 and the annular flange 29 are concentric. The inner side of the support ring 35 and also the upper end face of the support ring 35 are coated with the hard plating 30. The lower seal seat 13a is arranged on the lower side of the support ring 35, the lower seal seat 13a being arranged concentrically with the support ring 35 or generally with the upper pipe nozzle 18. The upper seal seat 13a is screwed to the support ring 35. Together, the upper seal seat 13a and the remaining components of the upper pipe nozzle including the support ring 35 and the annular flange 29 form a singly manageable unit which is releasably connected to the valve housing 10 and can be removed as one unit from the valve housing 10.

In the installation state according to FIG. 2 it can be seen that the upper pipe nozzle 18 is arranged in a housing receiving area 36 of the valve housing 10. The housing receiving area 36 is also easy to see in FIG. 3 and is formed integrally with the valve housing 10. The housing receiving element 36 forms a holding ring, into which the upper pipe nozzle 18 is inserted, as can be seen in FIG. 2. The housing receiving area 36 together with the remaining wall of the valve housing 10 is drawn in FIG. 2 as a transparent component.

FIGS. 2 and 3 further show that the guide pipe 11 has a lower pipe nozzle 19 which is screwed below the valve disc 12 to the housing.

To remove the valve disc 12 for maintenance purposes the valve disc 12 has a central threaded bore 37, into which for example a hook can be inserted.

The valve disc 12 forms a round disc. In this respect the shape of the valve disc 12 corresponds to the cross-section of the guide pipe 11. The shape of the receiving opening 16 is correspondingly circular.

The sealing function of the single disc gate valve according to FIG. 1 will be explained by reference to FIG. 4.

The upper seal seat 13a has three sealing components which lead to a triple acting sealing system. Single acting or multiple acting sealing systems can be used. The upper seal seat 13a is a static seal seat. This is to be understood to be a seal seat which is used as a counter bearing for the valve disc 12 if this is subjected contrary to the upper seal seat 13a with a pressing force. In other words the upper seal seat 13a cannot deviate if the valve disc 12 is pressed against it. In contrast, a dynamic seal seat is to be understood to be a seal seat is that actively applies the necessary pressing force to the valve disc 12. In contrast with such known dynamic seal seats the upper seal seat 13a is static. The necessary pressing force for the sealing effect is applied by the axially movable valve disc 12.

The upper seal seat 13a has a radially inwardly arranged sealing and scraping edge 20, which is also described as a scraper. The radially inwardly arranged sealing and scraping edge 20 forms the inner edge of the upper pipe nozzle 18 which lies against the valve disc 12. The sealing and scraping edge 20 forms a metal seal which is in abutment with the valve disc 12. The further function of the sealing and scraping edge 20 involves scraping off any impurities sticking to the valve disc 12. A further sealing of the upper seal seat 13a is formed by the metal seal 21 which is arranged—with respect to the sealing and scraping edge 20—radially outwards. The metal seal 21 forms the outer circumference of the upper seal seat 13a and is pre-tensioned by a spring 38 against the valve disc 12. Other arrangements or possibilities of pre-tensioning of the metal seal 21 are possible. The upper seal seat 13a further has a so-called compensator 39 which is arranged concentrically with the upper pipe nozzle 18. The compensator is a corrugated pipe which can be compared with a very strong spring. The compensator 39 is arranged in an annular groove 40 which extends above the metal seal 21 around the circumference of the upper pipe nozzle 18. The annular groove 40 is downwardly limited by a receiving ring 41, in which the springs 38 for the radially outwardly arranged metal seal 21 are arranged. The receiving ring 41 lies against the metal seal 21. It is also possible to form the receiving ring 41 and the metal seal 21 in one part.

The third sealing system of the upper seal seat 13a is formed by a gas barrier, in particular a vapour barrier 22, which is connected to the purge and barrier gas connection 31 already described in association with FIG. 1. The vapour barrier 22 is formed by a further annular groove 42 which extends concentrically between the sealing and scraping edge 20 and the metal seal 21.

With respect to the upper seal seat 13a there are also other methods for implementation.

Figure 4:
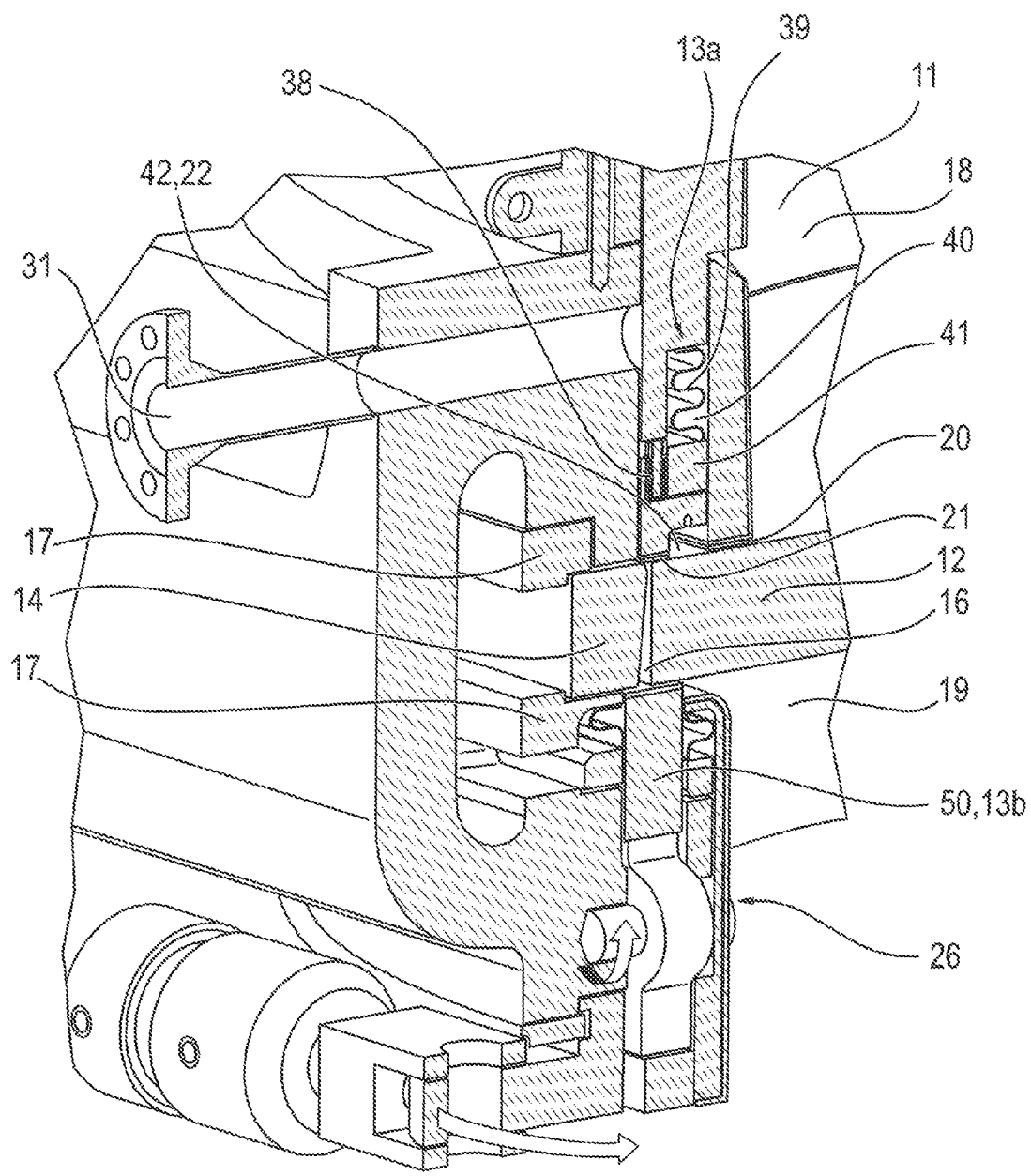
FIG. 4 a detailed view of the upper seal seat.

It can further be seen in FIG. 4 that the receiving opening 16 of the carrier plate 14 forms a concentrically downwardly widening edge which serves to discharge downwards any impurities that penetrate between the valve disc 12 and the receiving opening 16.

The valve disc 12 has radial play in the receiving opening 16 in order on the one hand to be able to compensate for thermal distortion and on the other hand to securely facilitate the axial movement of the valve disc 12 with respect to the carrier plate 14.

For the already mentioned pressing force of the valve disc 12 against the static upper seal seat 13a, a pressing means 26 is provided which is arranged below the valve disc 12. In other words, the valve disc 12 is arranged between the pressing means 26 and the upper seal seat 13a which serves as a counter bearing for the pressing means 26.

The pressing force of the pressing means 26 is caused by a plurality of force means 23 distributed around the circumference of the valve disc 12.

In general, in connection with the invention, specifically with the embodiment according to FIG. 4, it is disclosed and claimed that the force means 12 are arranged on the outer side of the valve disc 12. In other words, the force means 23 are arranged approximately at the height of the outer edge of the valve disc 12. It is thereby reliably ensured that the force means 23 or generally the pressing means 26 are arranged outside of the fluid passage 28. In the single disc gate valve according to FIGS. 1-5, the fluid passage is structure-free in the closed position apart from valve disc 12.

The force means 23 distributed around the circumference of the valve disc 12 are used to subject the valve disc to the pressing force in each case in the direction of the longitudinal axis of the guide pipe. In other words, the pressing force acts perpendicularly to the valve disc 12.

The mechanical pressing means shown in FIG. 4 is replaced in the example embodiment according to the invention by the hydraulic pressing means 26 according to FIGS. 5 to 8.

Figure 5:
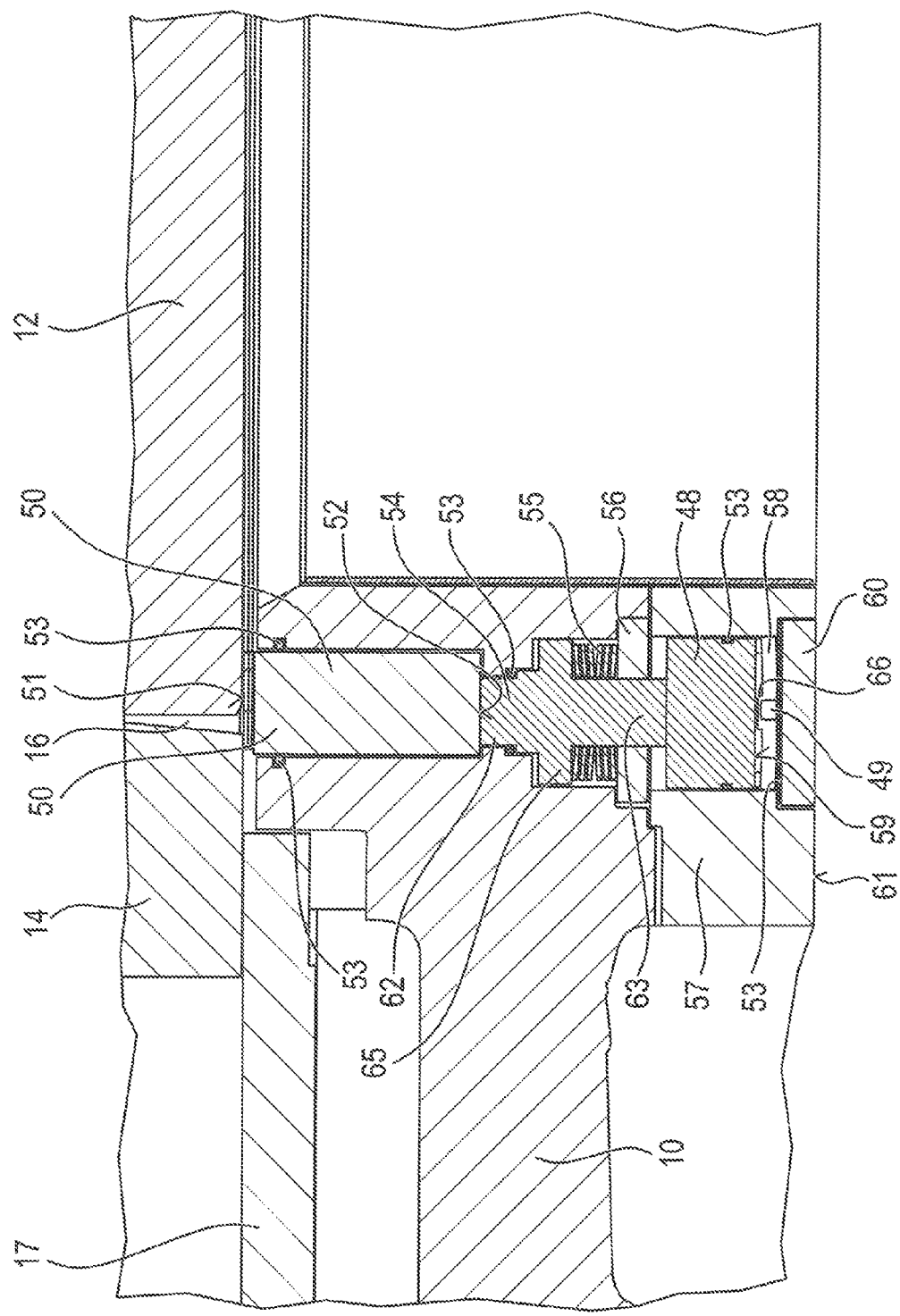
FIG. 5 a section through the hydraulic pressing means of a shut-off device according to an embodiment according to the invention which can be used for example in the single disc gate valve according to FIG. 1.

FIG. 5 shows a section through a shut-off device for valve systems of industrial plants which are used in the gate valve shown in FIGS. 1 to 4. The shut-off device has a disc 12 and a seal seat 13a (not shown). The disc 12 is used to shut off an opening for a fluid flow, for example the guide pipe 11. For this, the disc 12 is arranged to be movable in a housing 10, in particular the valve housing 10. The disc 12 corresponds to the valve disc 12 shown in FIGS. 1 to 4.

The disc 12 is arranged between the seal seat 13a and the hydraulic pressing means 26. The pressing means 26 is used to impact the disc 12 with a pressing force which presses it against the seal seat 13a. The pressing means 26 has a plurality of pistons 48 which are arranged around the circumference at the edge of the disc 12. In other words the pistons 48 are arranged on a circular line, i.e. a circumference. The pistons 48 are equidistantly arranged.

To transmit the piston force to the disc 12, a transmission element is provided in the form of a ring 50. The ring is arranged between the piston 48 and the disc 12 in an upwardly open annular groove in the housing 10. The ring 50 projects over the upper edge of the annular groove and lies permanently against the disc lower side due to a spring pre-tensioning.

The ring 50 has a dual function. On the one hand the ring 50 functions as a force transmission means in order to press the disc 12 against the upper seal seat 13a. On the other hand the ring 50 itself carries out a sealing function and forms the lower seal seat 13b which seals the disc 12 from below. Added to this is that the ring 50 blocks the gate valve and the shut-off device, through the great pressing forces that can be produced with the pressing means 26, in the closed position and secures them against undesired opening. This blockade function is not possible with the conventional dynamic seal seats which are merely designed to increase the sealing force.

Figure 6:
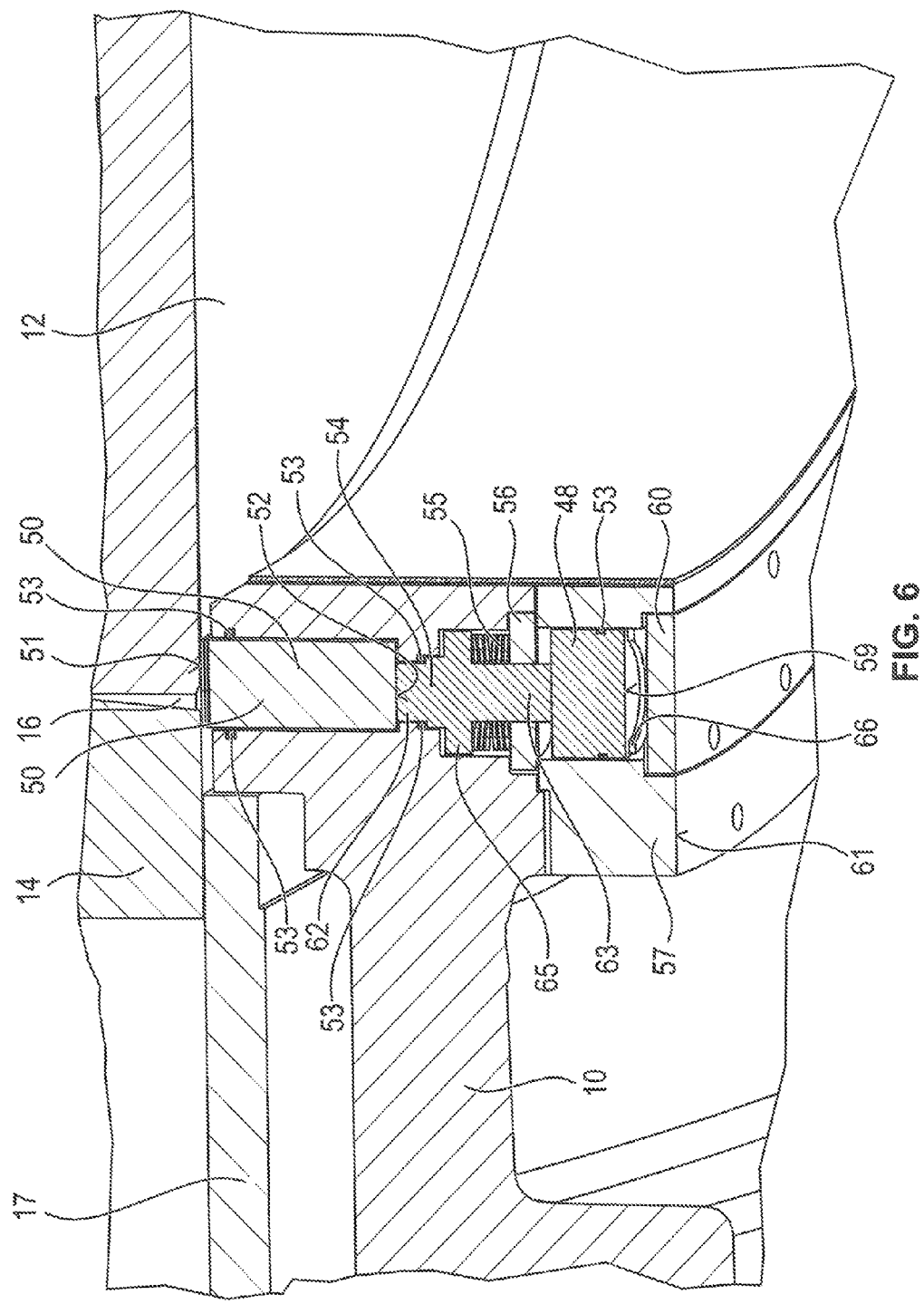
FIG. 6 a perspective view of the cut-open pressing means according to FIG. 6.

As can be seen in FIGS. 4 and 6, the ring 50 overlaps both the disc 12 and also the edge of the receiving opening 16 in the carrier plate 14. Sufficient play is provided between the lower edge of the receiving opening 16 and the ring 50 in order to facilitate the axial movement of the ring 50 in the longitudinal direction of the guide pipe or perpendicularly to the disc 12, through which the disc 12 is subjected to the pressing force. In other words, the blocking of the ring 50 by the carrier plate 14 is avoided.

The disc 12, the ring 50 or the annular groove and the pistons 48 are concentrically arranged.

The pistons 48 are fluidically connected by a shared feed line 49 for the supply of hydraulic fluid. The pistons 48 are thus arranged in series. The feed line 49 is connected to a hydraulic connection (not shown), via which the pistons 48 can be centrally actuated. The hydraulic connection can be connected to a hydraulic pump (likewise not shown). During operation the feed line 49 and also the pressure chambers 58 (to be clarified below) are completely filled with hydraulic fluid.

As can be seen in FIG. 5, the ring 50 has an axial end face 51, 52, wherein a first, upper end face 51 lies directly against the disc 12. The second, lower end face 52 of the ring 50 is connected to the piston 48 so that the pressing force produced by the individual pistons 48 is transmitted via the ring 50 to the disc 12. The connection between the pistons 48 and the ring 50 is realised by tappets 54 which are arranged between the pistons 48 and the ring 50. In other words, each piston 48 has its own tappet 54 assigned to it, which connects the piston 48 in question to the ring 50.

The lifting direction of the pistons 48 extends perpendicularly to the disc 12. In other words, the pistons 48 are moved parallel to the longitudinal axis of the guide pipe 11. The longitudinal axis of the tappets 54 and the lifting direction of the pistons 48 align.

Each tappet 48 has an upper and a lower guide portion 62, 62 which preferably align. The upper guide portion 62 is mounted to be axially movable in a bore in the housing 10. The bore opens into the bottom of the annular groove of the ring 50. The upper guide portion 62 has such dimensions that it can submerge into the annular groove and subject the ring 50 to a pressing force.

Figure 8:
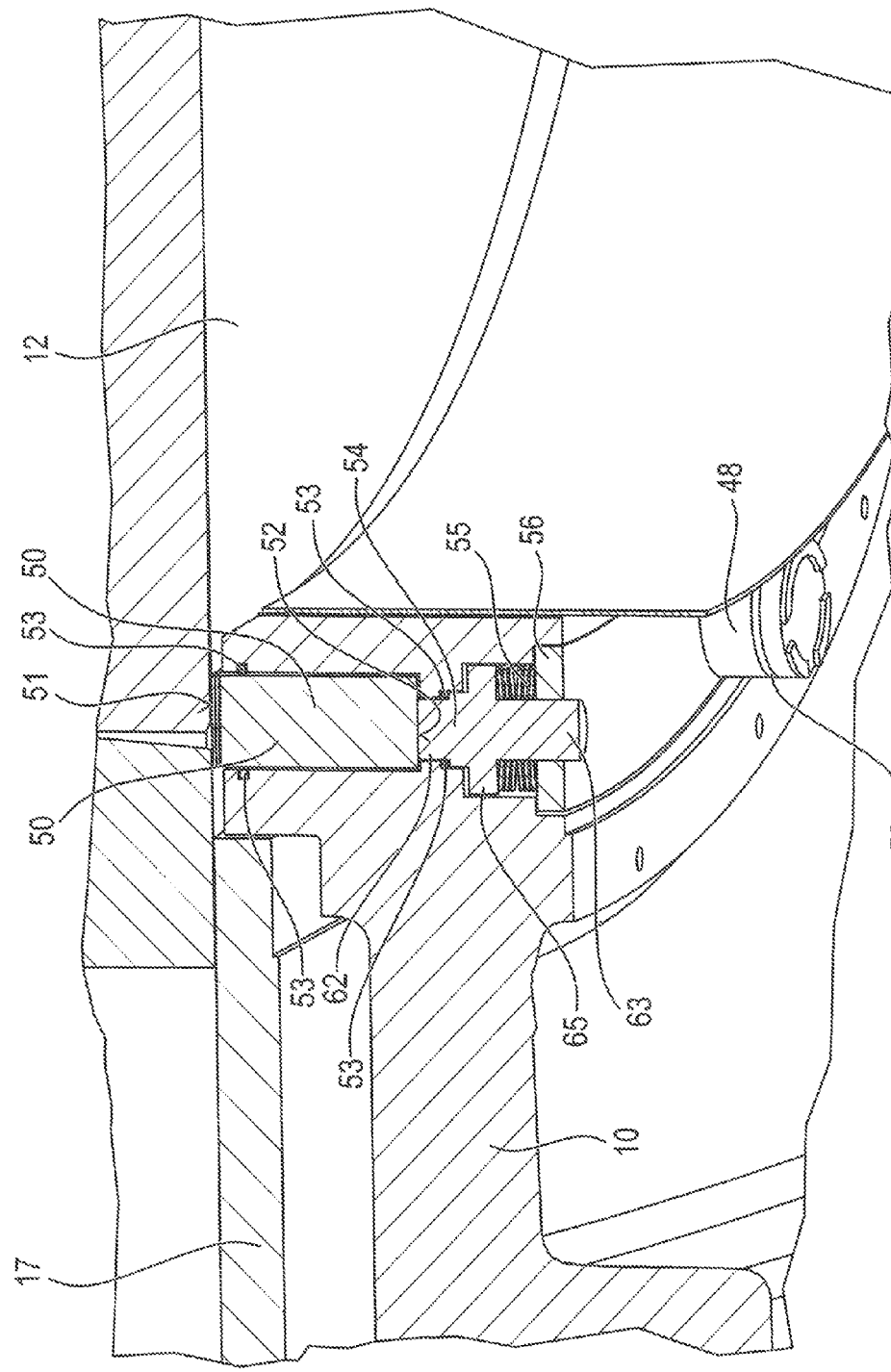
FIG. 8 the perspective view according to FIG. 7 without piston guide ring.

The lower guide portion 63 is mounted in a tappet guide ring 56. For this, the lower guide portion 63 engages through a bore in the tappet guide ring 56 and projects downwards towards the piston 48 via the tappet guide ring 56 (FIG. 8). The tappet guide ring 56 is arranged in a corresponding annular recess in the housing 10 and connected, for example in a force-locking way, to the housing 10.

A shoulder 65 is arranged between the upper and the lower guide portion 62, 63. The shoulder 65 projects in the radial direction over the lower guide portion 63. The lower side of the shoulder 65 forms an abutment surface for a spring 55 which is arranged between the shoulder 65 and the tappet guide ring 56 and pre-tensions the tappet 54 against the ring 50. A permanent pre-tensioning force is thus applied to the ring 50 which acts in the direction of the disc 12 so that, upon opening or closing of the disc 12, the sealing effect is maintained. Springs other than the plate springs shown in FIG. 5 are possible.

The ring 50, the tappets 54 and the pistons 48 are each sealed against the housing by sealing elements 53, for example sealing strips and O rings made of heat-resistant material.

As can be seen in FIGS. 5 and 6, the piston 48 and the tappet 54 form separate components which are in abutment for force transmission. It is also possible to form the pistons 48 and tappet 54 as one part. The advantage of the separate components is simplified assembly.

The further pistons 50 and tappets 54 (not shown) are correspondingly constructed. The number of pistons 48 depends upon the nominal width of the disc 12. In the case of a nominal width of 1800 mm for a FCC (fluidised catalytic cracking) unit, for example approximately 20 pistons on the circumference can be sufficient. The pistons can each have a diameter of approximately 8-10 cm. Larger or smaller nominal widths can require a larger or smaller number of pistons which is determined by the person skilled in the art. The piston diameter can be adapted to the respective operating conditions during configuration of the pressing means.

The mounting of the pistons 48 is realised by a piston guide ring 57 which is connected to the housing 10, for example being screwed to it. The threaded bores can be seen in FIG. 8. The piston guide ring 57 has a number of cylinder bores aligned with the longitudinal axis of the tappets 54 which corresponds to the number of pistons 48. The piston guide ring 57 lies against the tappet guide ring 56 and fixes it in the recess in the housing 10.

Figure 7:
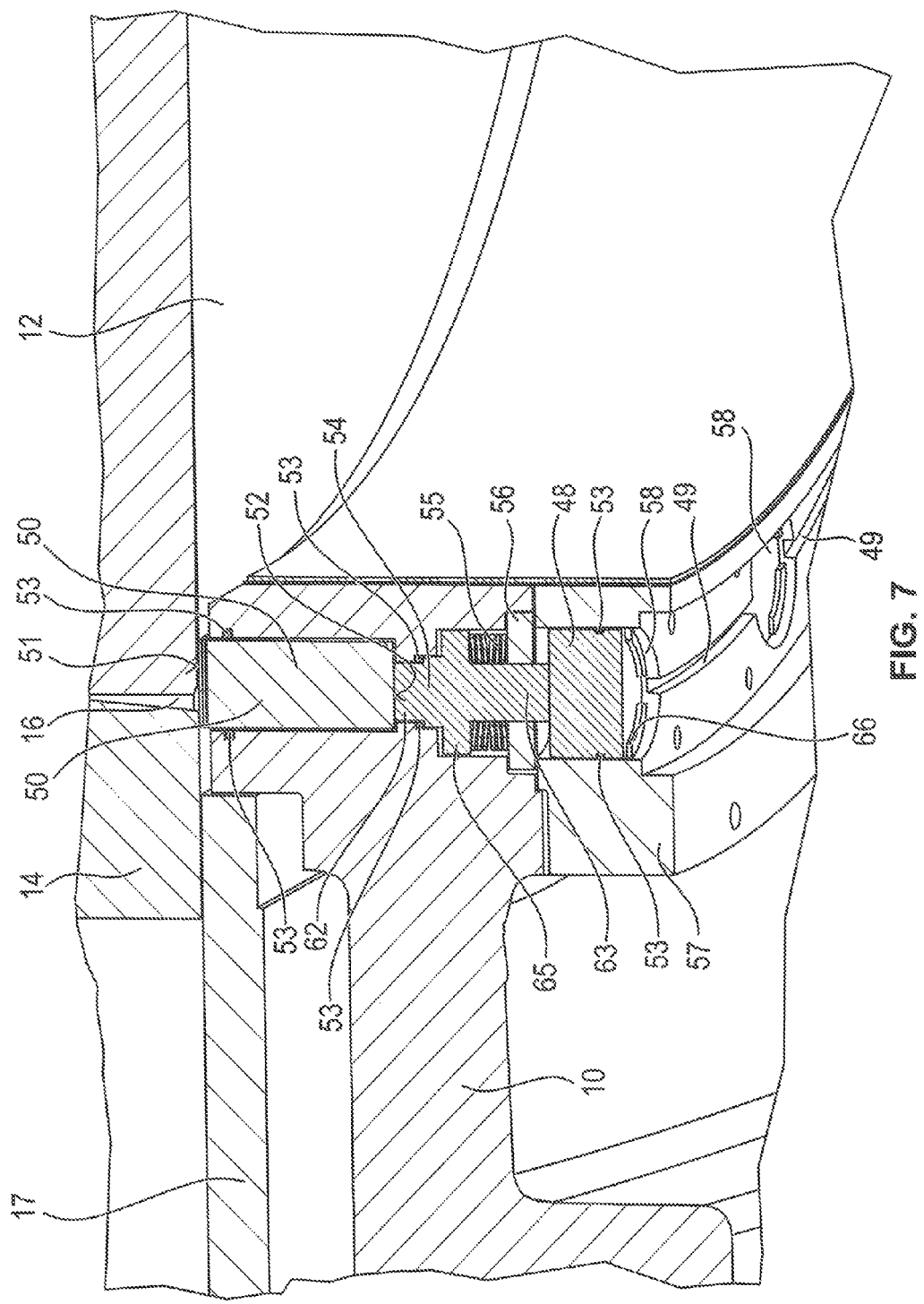
FIG. 7 the perspective view according to FIG. 7 without cover.

In the lower side 61 of the piston guide ring 57 the feed line 49 is formed, for example in the form of a connecting groove, which fluidically connects all pistons 48 (FIGS. 5, 7). The feed line 49 thus forms a pressure channel which is delimited on the one hand by the piston guide ring 57 and on the other hand by an annular cover 60 which is connected, for example screwed, to the lower side 61 of the piston guide ring 57. A sealing element 53 is placed between the cover 60 and the lower side 61 of the piston guide ring 57. The cover 60, the piston guide ring 57 and the tappet guide ring 56 are concentrically arranged.

The piston guide ring 57 forms a number of pressure chambers 58 that align with the cylinder bores of the pistons 48 which corresponds to the number of pistons 48. The diameter of a pressure chamber 58 corresponds to the diameter of the respective cylinder bore. The feed line 49 connects the pressure chambers 58 and thus produces the fluidic connection between the pistons 48.

The pressure chambers 58 are separated from the respective cylinder bore by a stop 66 which holds the piston in the pressure-free state and prevents the mouth of the feed line 49 becoming blocked if the hydraulic pressure falls too greatly (FIGS. 5 to 7).

Figure 9:
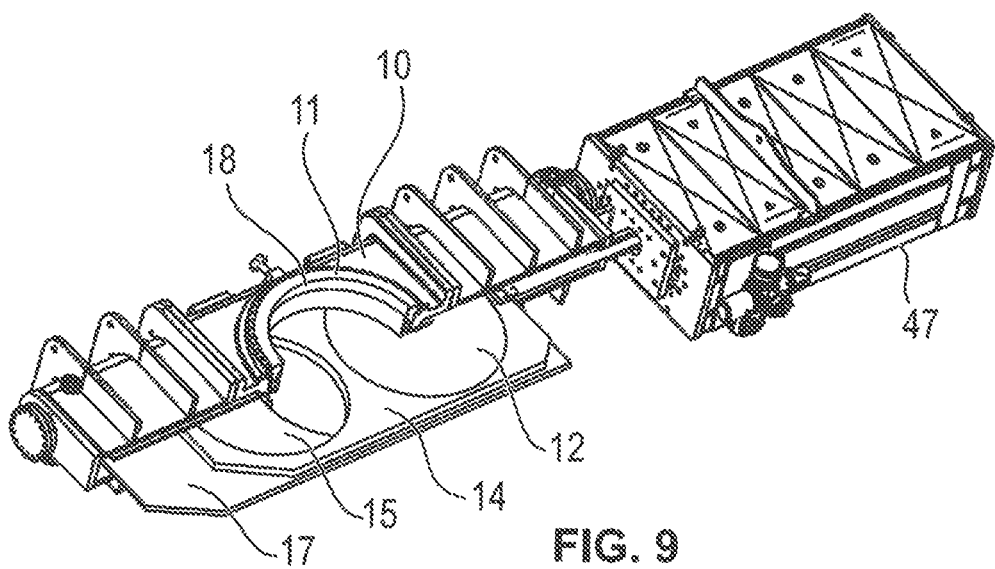
FIG. 9 a perspective, partially cut-open view of a single disc gate valve.

FIG. 9 shows a further example embodiment of a single disc gate valve according to the invention which differs from the single disc gate valve according to FIG. 1 through the further drive 47. It can clearly be seen in FIG. 9 that the carrier plate 14 receives on the one hand the passage opening 15 and on the other hand the valve disc 12 as a separate component. The valve disc 12 is formed as a circular disc which is arranged in the closed position concentrically with the guide pipe 11.

The invention is not limited to the above-described embodiments and many modifications are possible within the scope of the following claims. Indeed, a person of ordinary skill in the art would be able to use the information contained in the preceding text to modify various embodiments of the invention in ways that are not literally described, but are nevertheless encompassed by the attached claims, for they accomplish substantially the same functions to reach substantially the same results. Therefore, it is to be understood that the invention is not limited to the specific embodiments disclosed and that modifications and other embodiments are intended to be included within the scope of the appended claims. Although specific terms are employed herein, they are used in a generic and descriptive sense only and not for purposes of limitation.

LIST OF REFERENCE NUMERALS

10 Housing (valve housing)
11 Guide pipe
12 Disc (valve disc)
13a Upper seal seat
13b Lower seal seat
14 Carrier plate
15 Passage opening
16 Receiving opening
17 Guide plates
18 Upper pipe nozzle
19 Lower pipe nozzle
20 Sealing and scraping edge
21 Metal seal
22 Vapour barrier
23 Force means
26 Pressing means
27 Bonnets
28 Fluid passage
29 Annular flange
30 Hard plating
31 Purge and barrier gas connection
34 Actuating rod
35 Support ring
36 Housing receiving area
37 Threaded bore
38 Spring
39 Compensator
40 Annular groove
41 Receiving ring
42 Annular groove
45 Gas connections
47 Drive
48 Piston
49 Feed line
50 Ring (transmission element)
51 First end face
52 Second end face
53 Sealing elements
54 Tappet
55 Spring
56 Tappet guide ring
57 Piston guide ring
58 Pressure chambers
59 Piston head
60 Cover
61 Lower side
62 Upper guide portion
63 Lower guide portion
64 Sealing projection
65 Shoulder
66 Stops That which is claimed:

1. Shut-off device for valve systems of industrial plants, said shut-off device comprising:
   a disc (12) to shut off an opening for a fluid flow; and
   a seal seat (13a),
   wherein:
      the disc (12) is arranged between the seal seat (13a) and a pressing mechanism (26) to subject the disc (12) to a pressing force that presses the disc (12) against the seal seat (13a);
      the pressing mechanism (26) comprises, in a housing (10), a plurality of integrated pressing components (48, 54) and a transmission element for transmitting the pressing force to the disc (12), the transmission element being positioned between the plurality of integrated pressing components (48, 54) and the disc (12) and extending along a circumference of the disc (12), each of the plurality of integrated pressing components comprising a respective piston portion (48) and a respective tappet portion (54); and
      the plurality of integrated pressing components (48, 54) are fluidically connected by a feed line (49) for hydraulic fluid.

2. Shut-off device according to claim 1, wherein the transmission element comprises a ring (50), of which the first end face (51) lies against the disc (12) and of which the second end face (52) is connected to the plurality of integrated pressing components (48, 54).

3. Shut-off device according to claim 2, wherein the lifting direction of the plurality of integrated pressing components (48, 54) extends perpendicularly to the disc (12).

4. Shut-off device according to claim 2, wherein the ring (50) is subjected to a spring force acting perpendicularly to the disc (12).

5. Shut-off device according to claim 1, wherein the transmission element is subjected to a spring force acting perpendicularly to the disc (12).

6. Shut-off device according to claim 1, wherein:
the tappet portion (54) of each of the plurality of integrated pressing components (48, 54) is connected to a spring (55).

7. The shut-off device according to claim 6, wherein:
the tappet portion (54) of each of the plurality of integrated pressing components (48, 54) comprises an upper guide portion (62) and a shoulder (65); and
the shoulder (65) is positioned intermediate the upper guide portion (62) of the tappet portion (54) and the piston portion (54) of each of the plurality of integrated pressing components (48, 54).

8. Shut-off device according to claim 1, wherein the plurality of integrated pressing components (48, 54) are positioned at least partially within a piston guide ring (57), in which the feed line (49) for the hydraulic fluid is formed.

9. Shut-off device according to claim 8, wherein the piston guide ring (57) has an annular cover (60) which closes a lower side (61) of the piston guide ring (57).

10. The shut-off device according to claim 1, wherein the plurality of integrated pressing components (48, 54) are positioned at least partially within a piston guide ring (57) that has an annular cover (60) that closes a lower side (61) of the piston guide ring (57).

11. The shut-off device according to claim 1, wherein:
the tappet portion (54) of each of the plurality of integrated pressing components (48, 54) comprises an upper guide portion (62) and a shoulder (65); and
the shoulder (65) is positioned intermediate the upper guide portion (62) of the tappet portion (54) and the piston portion (54) of each of the plurality of integrated pressing components (48, 54).

12. The shut-off device according to claim 11, wherein:
the tappet portion (54) of each of the plurality of integrated pressing components (48, 54) is connected to a spring (55); and
a lower surface of the shoulder (65) forms an abutment surface for an upper end of the spring (55).

13. The shut-off device according to claim 12, wherein the shoulder (65) is positioned within a piston guide ring (57) that has an annular cover (60) which closes a lower side (61) of the piston guide ring (57).

14. The shut-off device according to claim 12, wherein the positioning of the spring (55) relative to the shoulder (65) at least in part pre-tensions each of the plurality of integrated pressing components (48, 54) against the transmission element.

15. Gate valve for chemical and petrochemical plants, said gate valve comprising:
a housing (10) which has a guide pipe (11) that can be shut off; and
a disc (12) which can be displaced into an open position and into a closed position and vice versa,
wherein:
a seal seat (13a) is assigned to the guide pipe (11), the seal seat (13a) extending around the circumference of the guide pipe (11) and sealing during operation, at least in the closed position, from above against the disc (12);
the disc (12) is arranged in a displaceable carrier plate (14) such that the disc (12) is selectively movable relative to the carrier plate (14) in the direction of the longitudinal axis of the guide pipe (11);
a pressing mechanism (26) is positioned in the housing (10) below the disc (12) and configured to press the disc (12) in the closed position against the seal seat (13a);
the pressing mechanism (26) comprises a plurality of integrated pressing components (48, 54) and a transmission element to transmit the pressing force to the disc (12), each of the plurality of integrated pressing components comprising a respective piston portion (48) and a respective tappet portion (54);
the integrated pressing components (48, 54) are fluidically connected by a feed line (49) for hydraulic fluid; and
the transmission element is positioned between the integrated pressing components (48, 54) and the disc (12) and extends along the disc circumference.

16. Gate valve according to claim 15, wherein the transmission element is a ring (50).

17. Gate valve according to claim 15, wherein the disc (12) is sized to provide radial play relative to the carrier plate (14).

18. Gate valve according to claim 15, wherein the shape of the disc (12) is the same as a cross-sectional shape of the cross-section of the guide pipe (11).

19. Gate valve according to claim 18, wherein the disc is a round disc.

20. Gate valve according to claim 15, wherein:
the carrier plate (14) has a passage opening (15) and a receiving opening (16); and
the disc (12) is arranged in the receiving opening (16).

* * * * *